United States Patent
Kawakita et al.

(10) Patent No.: US 10,830,573 B2
(45) Date of Patent: Nov. 10, 2020

(54) DROPLET SIZE DETERMINING DEVICE AND DROPLET SIZE DETERMINING METHOD

(71) Applicant: NATIONAL INSTITUTE FOR MATERIALS SCIENCE, Ibaraki (JP)

(72) Inventors: Jin Kawakita, Ibaraki (JP); Toyohiro Chikyo, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 46 days.

(21) Appl. No.: 16/300,164

(22) PCT Filed: May 11, 2017

(86) PCT No.: PCT/JP2017/017838
§ 371 (c)(1),
(2) Date: Nov. 9, 2018

(87) PCT Pub. No.: WO2017/195861
PCT Pub. Date: Nov. 16, 2017

(65) Prior Publication Data
US 2019/0178621 A1    Jun. 13, 2019

(30) Foreign Application Priority Data
May 13, 2016    (JP) ................. 2016-097188

(51) Int. Cl.
*G01B 7/12*        (2006.01)
*G01N 27/00*      (2006.01)

(52) U.S. Cl.
CPC ............... *G01B 7/12* (2013.01); *G01N 27/00* (2013.01)

(58) Field of Classification Search
CPC .......... G01B 7/12; G01B 7/003; G01B 7/023; G01N 15/0606; G01N 15/0266;
(Continued)

(56) References Cited

U.S. PATENT DOCUMENTS

| 3,540,278 A | 11/1970 | Diamond |
| 2002/0078916 A1* | 6/2002 | Altmann .......... F02M 35/10013 123/184.21 |
| 2005/0120772 A1* | 6/2005 | Sullivan ................ G01N 13/04 73/1.02 |

FOREIGN PATENT DOCUMENTS

| EP | 3 173 778 | 5/2017 |
| JP | 60-78332  | 5/1985 |

(Continued)

OTHER PUBLICATIONS

Extended European Search Report dated Dec. 4, 2019 in corresponding European Patent Application No. 17796219.8.

(Continued)

*Primary Examiner* — Jermele M Hollington
*Assistant Examiner* — Suresh K Rajaputra
(74) *Attorney, Agent, or Firm* — Wenderoth, Lind & Ponack, L.L.P.

(57) ABSTRACT

The purpose of the present invention is to measure a size of a liquid droplet easily and in a short period of time by combining outputs of multiple types of liquid droplet detectors having different size dependencies of a liquid droplet of detection signals. In one embodiment of the present invention, in the detector having a narrow gap width shown in FIG. 5(*a*), the electrodes are electrically conducted by the attachment of a small liquid droplet. On the other hand, in the detectors with a wide gap width shown in FIGS. 5(*b*) and 5(*c*), the electrodes are not electrically conducted unless a liquid droplet having a larger size is attached. By utilizing this, the size of a liquid droplet is determined. In a case where the liquid droplet is water, as a liquid droplet detector, for example, a detector of a type that detects a galvanic (Continued)

current by a cell formed by the attachment of water between the electrodes made of different kinds of metals may be used.

12 Claims, 10 Drawing Sheets

(58) Field of Classification Search
CPC .............. G01N 27/00; G01N 15/1031; G01N 2015/0026; G01N 27/9046; G01D 5/202; G01D 18/00
See application file for complete search history.

(56) References Cited

FOREIGN PATENT DOCUMENTS

| JP | 8-261974 | 10/1996 |
|----|----------|---------|
| JP | 2002-195114 | 7/2002 |
| JP | 2012-2582 | 1/2012 |
| WO | 2016/013544 | 1/2016 |

OTHER PUBLICATIONS

Notice of Reasons for Refusal dated Nov. 26, 2019 in corresponding Japanese Patent Application No. 2018-517075.
International Search Report issued Jul. 11, 2017 in International Application No. PCT/JP2017/017838.
Jin Kawakita, "Moisture Sensor" Bisho na Suiteki o Kenshutsu Hanbetsu, Independent Administrative Institution National Institute for Materials Science HP, Apr. 6, 2017, http://www.nims.go.jp/nimsweek/pdf/D2_L8_Kawakita.pdf, with Machine Translation.
Tatsuya Ando et al., "Bisho Suiteki ga Sesshoku shita Micro Garubaniare no in-situ Kansatsu to Denryu Oto", The Surface Finishing Society of Japan Dai 135 Kai Taikai Koen Yoshishu, Mar. 1, 2017, pp. 72 to 73, with Machine Translation.
Masaaki Engaji et al., "Development of ACM Type Corrosion Monitor for Corrosion of Metals under Organic Coatings", Toyota Tech. rep., 40 (1987), p. 57.
Instruction manual Ver. 2 of a dew condensation detector MH-045 manufactured by EKO Instruments, with Machine Translation.
Jin Kawakita et al., "Galvanic response by micro droplets of metal arrays with microgaps", Zairyo-to-Kankyo, C-311, May 2016, with Machine Translation.
Jin Kawakita et al., "Sensor that determines the size of water droplets contained in moisture", The Surface Finishing Society of Japan, The 134th Annual Meeting Abstracts, 2E-19, Sep. 2016, with Machine Translation.
J. Kawakita et al., "Detection of micro/nano droplet by galvanic-coupled arrays", ECS Transactions, 75 (29) 51-59 (2017).
Jin Kawakita et al., "Detection/distinction of small aqua droplet using galvanic arrays with micro/nano gap", The Electrochemical Society of Japan, 1F30, Mar. 2017, with Machine Translation.

* cited by examiner (a)

(b)

481.8s (□)

488.0s (△)

510.8s (○)

DROPLET SIZE DETERMINING DEVICE AND DROPLET SIZE DETERMINING METHOD

TECHNICAL FIELD

The present invention relates to determining a size of a liquid droplet, and relates to, but is not limited to, a device with which a size of a fine water droplet or the like that is floating in the atmosphere or is condensed on a surface of an object can be determined, and to a method for determining a size by using the device.

BACKGROUND ART

When considering a water droplet floating, descending or the like in the atmosphere as an example of a liquid droplet, the size of the liquid droplet has an extremely wide range of from an extremely fine water droplet having a diameter (hereinafter, the size of a liquid droplet is represented by the diameter unless otherwise particularly specified) of less than 1 μm, a mist having a diameter of around 10 μm, a fog having a diameter of around 10 to 100 μm, a drizzle having a diameter of around 100 to 300 μm, a drizzling rain having a diameter of around 300 to 1000 μm, and further up to a rain having a diameter of around 1 mm or more such as an ordinary rain or a squall. In addition, also industrially, a solvent or a dispersion medium, in which a pure liquid, other gases, liquids, solids, or the like are dissolved or dispersed, has been widely used by spraying as finer liquid droplets for various applications. Alternatively, for example, when water vapor comes into contact with a surface of an object, fine water droplets appear as dew condensation on the surface, and further a liquid droplet formed on a surface of an object with the growth, the shrink or the like of the dew condensation with the lapse of time is also present. Further, there may be a case where a liquid droplet floating or the like in the air is attached onto a surface of an object.

In the technical field using a liquid droplet or in the technical field where it is preferred to avoid adverse effects due to the formation of a liquid droplet, it is frequently useful to easily determine the size of a liquid droplet. However, in the conventional technique, for example, in a case of a water droplet, it was easy to determine the macro amount called the total amount of water in the air by using a hygrometer, however, many of the detection units of a hygrometer are configured to measure the dynamic and electrical change amount when moisture in the environment is absorbed, and it was difficult to obtain the micro amount called the size of a liquid droplet easily and further in a short period of time. For example, in a case where the size of a liquid droplet attached onto a surface of an object is required to know, in principle, observation of the liquid droplet with a microscope is sufficient, however, this not only takes considerable labor but also takes considerable time to measure the size of a liquid droplet, and therefore, the real-time measurement is extremely difficult, and further there may also be a case where the size of a liquid droplet changes during measurement by requiring a measurement time or setting an object in a measurement device. In addition, the size of a liquid droplet can be determined by using a particle size analyzer, however, many of the particle size analyzers use an optical system element, and the device is required to be used in a fixed state in addition to having a desktop size. Alternatively, also by irradiating a floating liquid droplet with laser light and measuring the scattering or the diffraction, the size of a liquid droplet can be measured. However, in order to perform such a measurement, the device becomes large in scale, and therefore, the device cannot be applied in a case where it is desired to easily measure the size of a liquid droplet or in a case where it is required to make the measurement system extremely small.

SUMMARY OF INVENTION

Technical Problem

An object of the present invention is to solve the above-described problems of conventional techniques, and to determine the size of a liquid droplet easily and in a short period of time.

Solution to Problem

According to one aspect of the present invention, there is provided a droplet size determining device comprising a first type of liquid droplet detector having a first relationship between a size of a liquid droplet and a detection output, and a second type of liquid droplet detector having a second relationship different from the first relationship, wherein sizes of liquid droplets attached to the first type of liquid droplet detector and the second type of liquid droplet detector are determined at least on the basis of output signals from the first type of liquid droplet detector and the second type of liquid droplet detector.

Here, the first type of liquid droplet detector may provide a detection output in response to attachment of a liquid droplet having a size different from that of a liquid droplet of the second type of liquid droplet detector.

Further, the droplet size determining device further comprising at least one of another type of liquid droplet detectors having a relationship different from the first relationship and the second relationship, wherein sizes of liquid droplets attached to the first type of liquid droplet detector, the second type of liquid droplet detector, and another type of liquid droplet detector may be determined on the basis of output signals from another type of liquid droplet detector.

Further, a pair of electrodes may be arranged with a gap between the electrodes in the liquid droplet detectors, the electrodes are made of different kinds of metals from each other.

Further, the liquid droplet may contain water.

According to another aspect of the present invention, there is provided a droplet size determining method comprising determining sizes of liquid droplets attached to a first type of liquid droplet detector and a second type of liquid droplet detector at least on the basis of a first detection output from the first type of liquid droplet detector and a second detection output from the second type of liquid droplet detector, wherein the first type of liquid droplet detector has a first relationship between a size of a liquid droplet and a detection output, and wherein the second type of liquid droplet detector has a second relationship different from the first relationship.

Here, the first type of liquid droplet detector may provide the first detection output in response to attachment of a liquid droplet having a size different from that of a liquid droplet of the second type of liquid droplet detector.

Further, sizes of liquid droplets attached to the first type of liquid droplet detector, the second type of liquid droplet detector, and at least one of another type of liquid droplet detectors may be further determined on the basis of an output signal from another type of liquid droplet detector, wherein another type of liquid droplet detector has a relationship different from the first relationship and the second relationship.

Further, a pair of electrodes is arranged with a gap between the electrodes in the liquid droplet detectors, the electrodes are made of different kinds of metals from each other.

Further, the liquid droplet may contain water.

Further, the size of a liquid droplet to be determined may be a distribution of sizes of liquid droplets attached to the first type of liquid droplet detector and the second type of liquid droplet detector.

Further, the determination may be further performed on the basis of each output in a case where monodisperse liquid droplets are attached to the first type of liquid droplet detector and the second type of liquid droplet detector.

Further, the output in a case where the monodisperse liquid droplets are attached may include a group of outputs in a case where a size of the monodisperse liquid droplets is changed in a predetermined range.

Advantageous Effects of Invention

According to the present invention, the size of a liquid droplet can be determined by using an extremely simple configuration in a short period of time.

DESCRIPTION OF EMBODIMENTS

According to one embodiment of the present invention, a size of a liquid droplet is determined by combining multiple liquid droplet detectors having the relationships different from one another between the size of an attached liquid droplet and the detection output. As such a liquid droplet detector, for example, an electrode pair arranged at a predetermined gap can be used although the liquid droplet detector is not limited to thereto. For example, in Patent Literature 1 that has been previously filed by an applicant of the present application, a dryness/wetness responsive sensor (liquid droplet detector) in which thin wires made of different kinds of metals are arranged closely to each other on an insulating substrate, with which water droplets formed by attaching water droplets floating in the atmosphere or by condensing water vapor on a surface of the substrate (hereinafter, for the sake of simplicity, the description will be made by assuming that water droplets are attached, but of course, it does not exclude the case where water droplets are formed on a surface of a detector due to the condensation of water vapor instead of floating water droplets being attached. The formation of liquid droplets due to the condensation on a detector is also referred to as attachment in the present application) are detected, has been disclosed.

Figure 1:
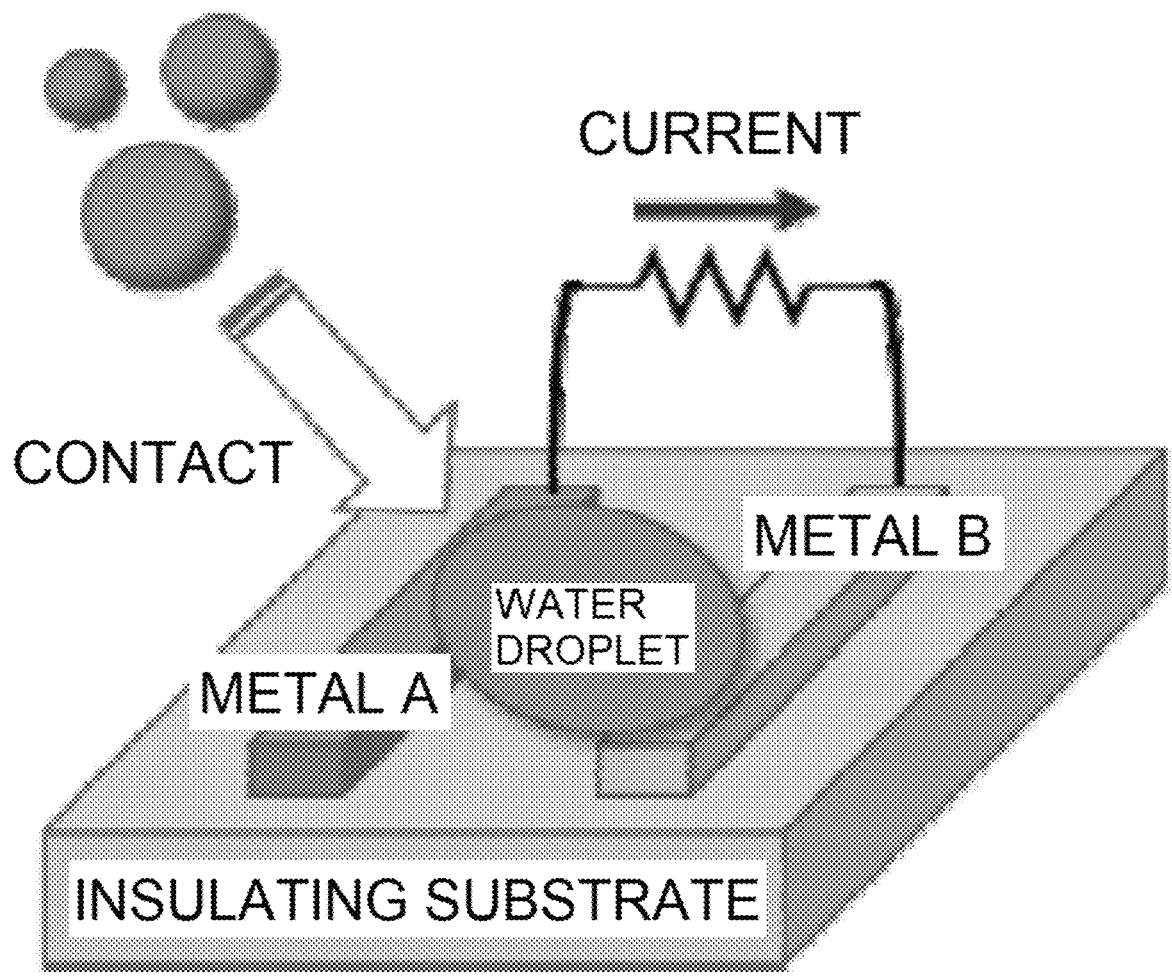
FIG. 1 is a conceptual diagram showing the operation of a liquid droplet detector described in Patent Literature 1.

Here, with reference to the conceptual diagram shown in FIG. 1, a case where a single water droplet is attached to an area between these thin wires made of different kinds of metals (hereinafter, also referred to as a gap) will be examined. In FIG. 1, when a water droplet is attached to a gap between the electrode made of a metal A (although not intended to be limited to this, a metal selected from, for example, platinum, silver, titanium, and various kinds of alloys of these metals, and further carbon is also handled as a kind of the metals that can be used here) and the electrode made of a metal B that is different from the metal A (although also not intended to be limited to this, a metal selected from, for example, silver, copper, iron, zinc, nickel, cobalt, aluminum, tin, chromium, molybdenum, manganese, magnesium, and various kinds of alloys of these metals), and comes into contact with both of the electrodes, a cell having a structure of [metal A]-[water functions as an electrolyte]-[metal B] is formed, and an electromotive force is generated between both the electrodes. Therefore, by electrically connecting between both the electrodes, a current (galvanic current) flows as shown in the diagram. By detecting this current, it can be determined whether or not a water droplet is present as a form of straddling over the electrodes.

It is noteworthy here that considering a case where a single water droplet is attached to a gap, in a case where the size of a water droplet is smaller than the width of the gap between both electrodes, since the above-described structure of ([metal A]-[water functions as an electrolyte]-[metal B]) of a cell is not apparently formed, any electromotive force is not generated between electrodes, and therefore, any current also does not flow. On the other hand, in a case where the size of a water droplet to be attached is larger than the width of the gap, it is influenced by where of the gap the water droplet is attached to, and by connecting between both the electrodes by the water droplet, the above-described structure of a cell is formed and a current flows. In other words, in a case where a single water droplet is attached to a random position between both the electrodes, a cell is formed between both the electrodes with a probability determined by a value of the ratio between the size of the attached water droplet and the size of the gap, and a current flows. Further, in this case, the size of the gap apparently becomes the threshold of the size of a water droplet in the sense that a current starts flowing.

In addition, it is considered that the current flowing between both electrodes is dependent on the kinds of the metals configuring the electrodes and the combination of the metals. Therefore, in completing the present invention, the inventors of the present application examined the influence of the composition of metals used for electrodes on the current flowing between both the electrodes as Preliminary Experiment 1.

As a liquid droplet detector for the experiment, a sensor having an opposing comb structure in which one obtained by covering a surface of a silicon wafer with a silica layer is used as a substrate, and fine wires (arrays) made of different kinds of metals were alternately arranged as electrodes on the substrate was fabricated. As the combination of different kinds of metals, two combinations of Cu/Au and Al/Au were used. The thin wire electrode gap is set to be 0.5 to 10 μm, the electrode width is set to be 1 μm, the electrode thickness is set to be 0.1 μm, and the number of sets of electrodes is set to be 50. A current measuring instrument equipped with the liquid droplet detector is arranged on an observation stage of an optical microscope, water droplets were introduced onto a surface of the detector by using a nebulizer (NE-U17 manufactured by OMRON Corporation, water droplet diameter: around 1 to 8 μm), and the output signal (current) from the detector was measured at the minimum measurement interval of 0.2 seconds. For observation of the surface of the detector, an optical microscope (VHX-5000 manufactured by KEYENCE CORPORATION) was used.

Figure 2:
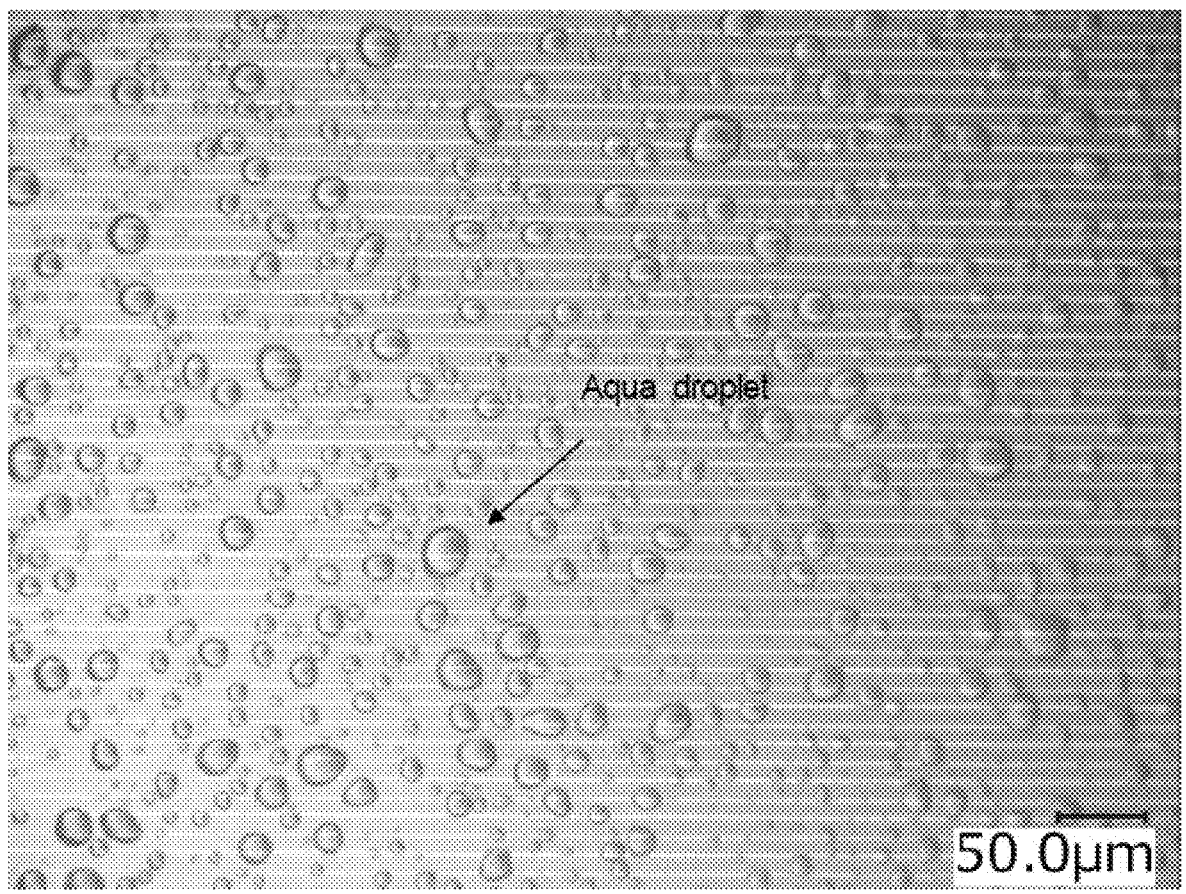
FIG. 2 is an optical microscope image when water droplets (aqua droplets) attached onto a surface of a liquid droplet detector having the structure shown in FIG. 1.

One example of an optical microscope image when water droplets (aqua droplets) are attached onto a surface of a detector is shown in FIG. 2. It was confirmed that a current response from a detector was obtained at least when a water droplet was attached onto a surface so as to straddle (cover) over two electrodes adjacent to each other. In addition, a current response from a detector was obtained also in any electrode combination and in any electrode gap. As for the electrode combination, the current value was improved by around one digit at the maximum in the Al/Au as compared with that in the Cu/Au. This is considered to be because the Al/Au has a larger electromotive force as a galvanic couple than that of the Cu/Au, and the obtained current is increased assuming that the state of the water droplet to be attached onto a surface of a detector is the same, that is, the liquid resistance between the electrodes is the same. In this regard, as for the output signal, even when a cycle of spraying and drying water droplets was repeated, the output signals were almost the same.

In addition, on a surface of a sensor after water droplets were attached and dried on the surface, precipitates were observed between the electrodes in Cu/Au, while almost no change was observed in Al/Au. This is considered to be because as the galvanic reaction proceeds at the electrodes, the oxidation reaction of a metal to be the anode is generated, however, in the case of Cu, the solubility of $Cu^{2+}$ generated is relatively large, and the $Cu^{2+}$ ions move to the cathode side. On the other hand, in the case of Al, it is considered to be because the solubility of $Al^{3+}$ is extraordinarily small, and the $Al^{3+}$ ions are hardly soluble, and therefore the precipitates were not observed between the electrodes.

By the way, in Non Patent Literature 1 that is a prior art literature in the field of an atmospheric corrosion monitoring (ACM) sensor being one of applications of the sensor disclosed in Patent Literature 1, there is a report on the relationship between the distance of an electrode gap (between electrodes) of the ACM sensor and the sensitivity (current response) of the sensor. However, what is discussed in Non Patent Literature 1 is the relationship between the sensitivity of the sensor and the electrode gap, and is not focused on the size of a liquid droplet to be attached to the sensor, and therefore how the sensitivity changes in a case where the size of a liquid droplet is changed is outside the range of consideration.

In addition, a dew condensation sensor having an appearance similar to that in Patent Literature 1 is available on the market, and the description of the dew condensation sensor is provided in Non Patent Literature 2. However, in the chapter on "Measurement Principle" on Pg. 9, it is simply described only that "the measurement is performed by applying a voltage between gold-plated comb-shaped electrodes, and reading changes in resistance when a sensor gets wet by a comparator on a transducer." That is, in Non Patent Literature 2, the dew condensation is captured only from the macroscopic viewpoint of whether or not the detection surface is wet, conversely, it is irrelevant to the present invention in that no attention has been paid at all to the individual fine water droplet to be attached by the dew condensation. To begin with, the gap between the electrodes opposing each other in the dew condensation sensor shown here is considerably larger than the size of a fine liquid droplet, which is the finest size taken with the water to be targeted by this sensor (in a case where this gap width is estimated from the dimensions of respective parts of the dew condensation sensor shown in the chapter on "8-3. Dimensional drawing" on Pg. 12 in Non Patent Literature 2, it is considered that the gap width will not be less than 100 μm), and even considering from this, it can be considered that the relationship between the size of a liquid droplet and the detection output cannot be read from the description in Non Patent Literature 2.

In practice, it is a common case where multiple water droplets are attached to the gap. Here, when considering excluding an extreme case where an extremely large number of attached water droplets are linked to one another on a surface of a detector so that almost the entire surface of the gap is wetted, as the size of a water droplet to be attached onto a surface of a detector from the atmosphere (accurately, the initial size of attachment without considering the growth of a water droplet on the surface) is gradually increased, the current is started to flow under the influence of the size increase due to the gathering of water droplets in a stage where the size of a water droplet is somewhat smaller than the gap width, the current is continued to be increased for a while even if the size of a water droplet exceeds the gap width. In this regard, here, the number of the water droplets to be attached, and the time change of the size of a water droplet once attached are not taken into consideration. Therefore, in this detector, a certain functional relationship is established between the size of a water droplet and the detection output (current).

Here, the inventors of the present application conducted, as Preliminary Experiment 2 for confirming the function relationship described above, an in-situ measurement of the observation of the surface state of a liquid droplet detector when fine water droplets were in contact with the detector, and the current response from the detector at that time.

As a liquid droplet detector for the experiment, a sensor having an opposing comb structure similar to that in Preliminary Experiment 1 described above was fabricated. As the combination of different kinds of metals, two combinations of Cu/Au and Al/Au were used. The thin wire electrode gap is set to be 0.5 to 10 μm, the electrode width is set to be 1 μm, the electrode thickness is set to be 0.1 μm, and the number of sets of electrodes is set to be 50. A current measuring instrument equipped with the liquid droplet detector is arranged on an observation stage of an optical microscope, water droplets were introduced onto a surface of the detector by using a nebulizer (NE-U17 manufactured by OMRON Corporation, water droplet diameter: around 1 to 8 μm), and the output signal from the detector was measured at the minimum measurement interval of 0.2 seconds. In this regard, a shutter was arranged at a spray outlet of the nebulizer, and a process of opening this shutter for 3 seconds and then closing the shutter was repeated 5 times every 2 minutes. For the observation of the surface of the detector, a moving image (frame rate: 30 fps) was photographed by using an optical microscope (VHX-5000 manufactured by KEYENCE CORPORATION).

Figure 3:
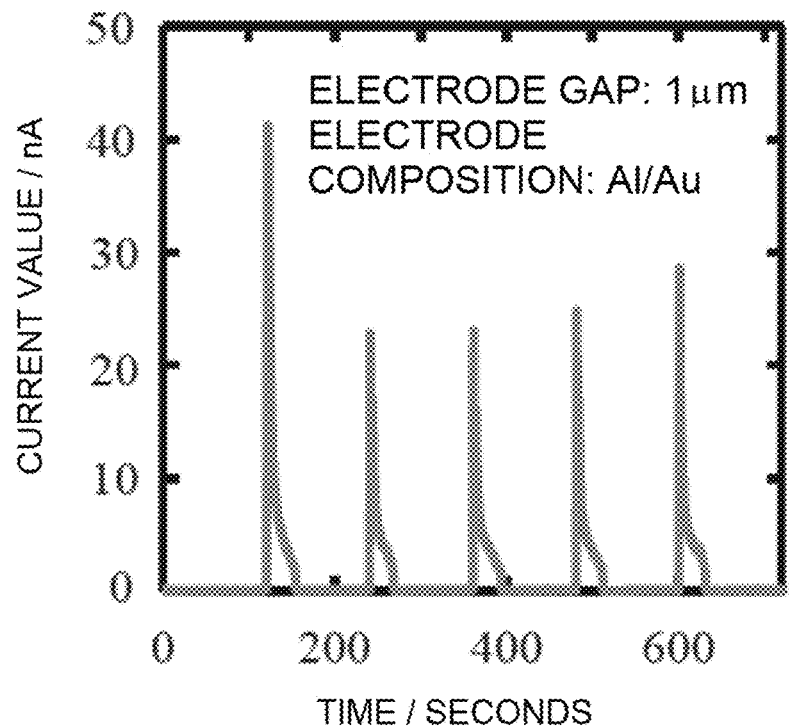
FIGS. 3(a) and 3(b) are diagrams showing changes with time in the current response when water droplets are sprayed onto a surface of a liquid droplet detector having the structure shown in FIG. 1.
Figure 3:
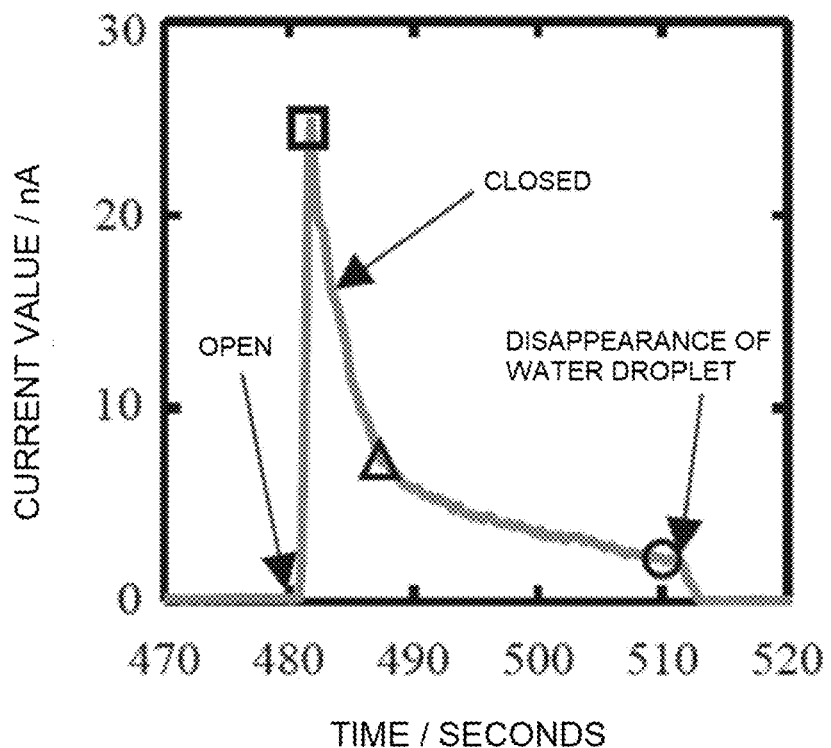
Figure 4A:
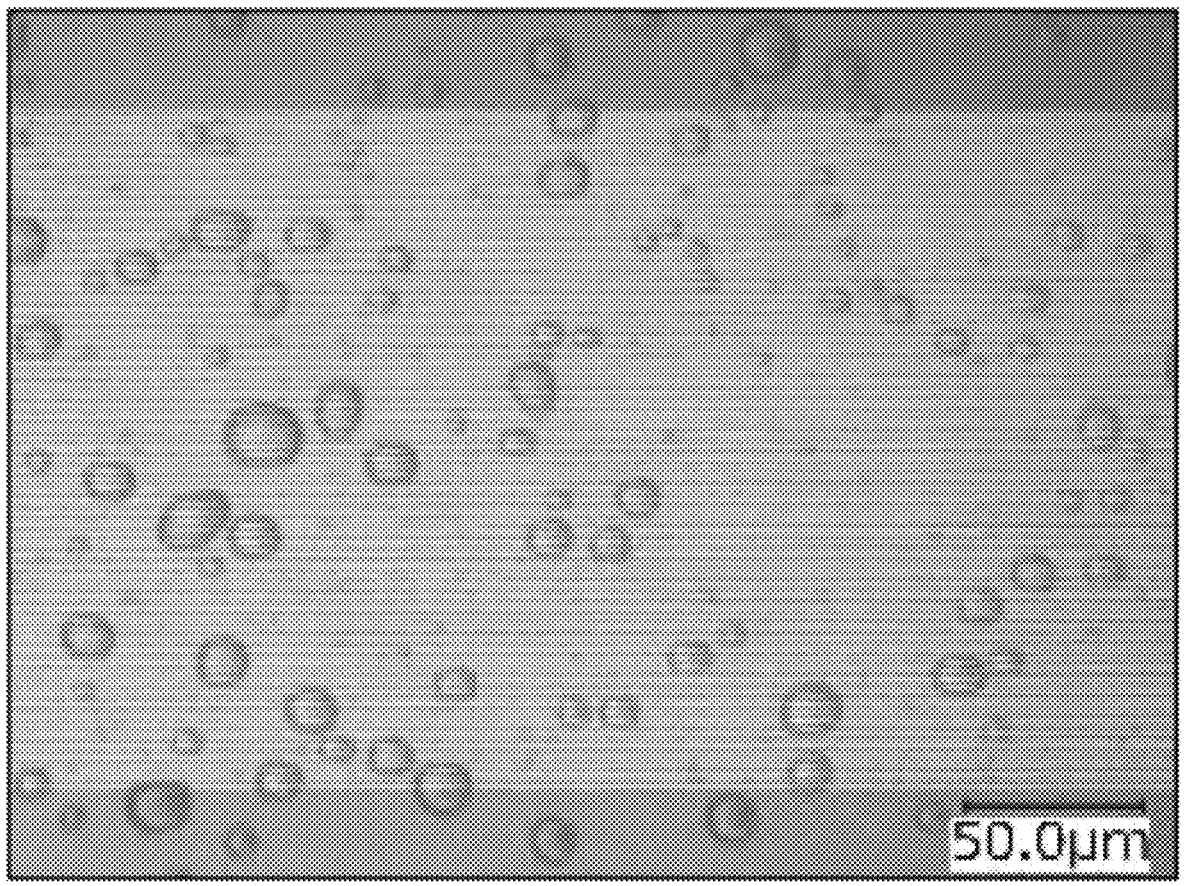
FIG. 4A is an optical microscope image on a surface of a detector, which is video clipped at a specific time in the current peak of the current response shown in FIG. 3.
Figure 4B:
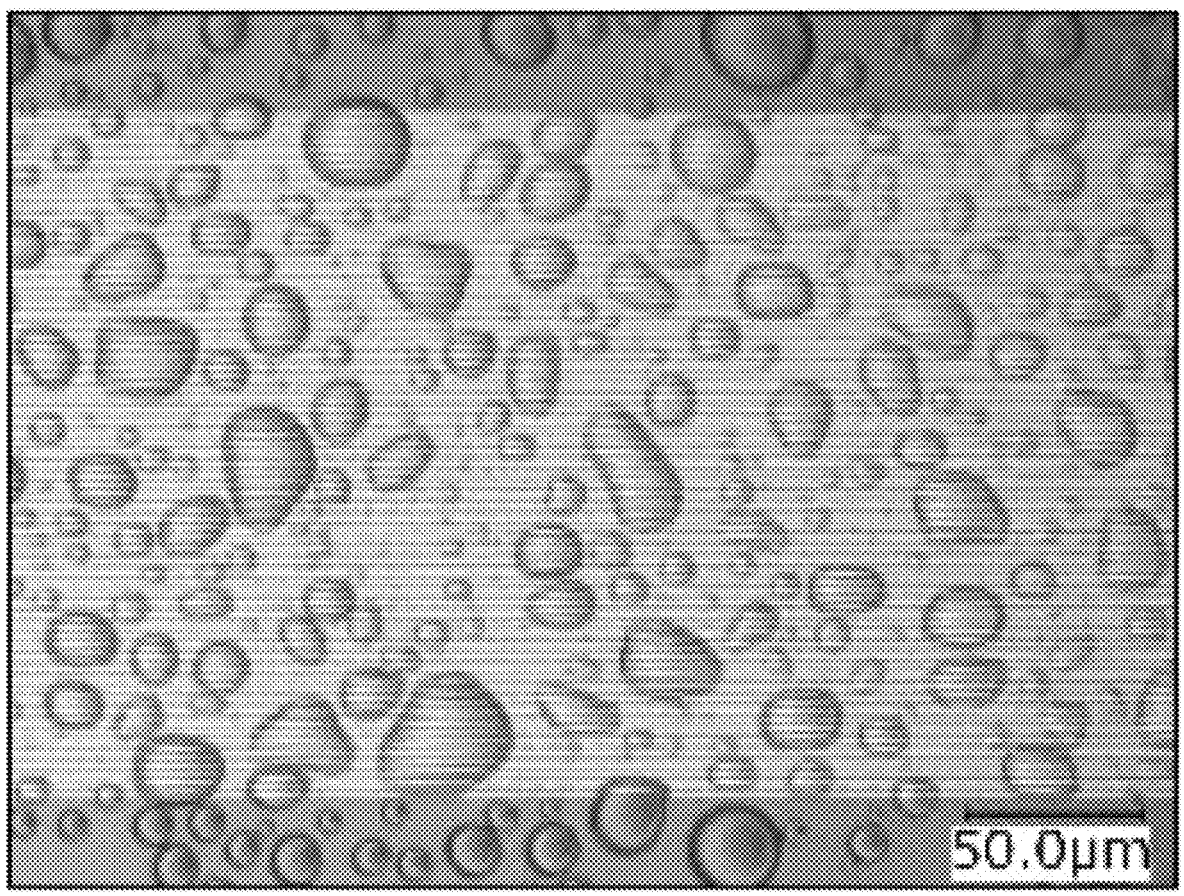
FIG. 4B is an optical microscope image on a surface of a detector, which is video clipped at a specific time in the current peak of the current response shown in FIG. 3.
Figure 4C:
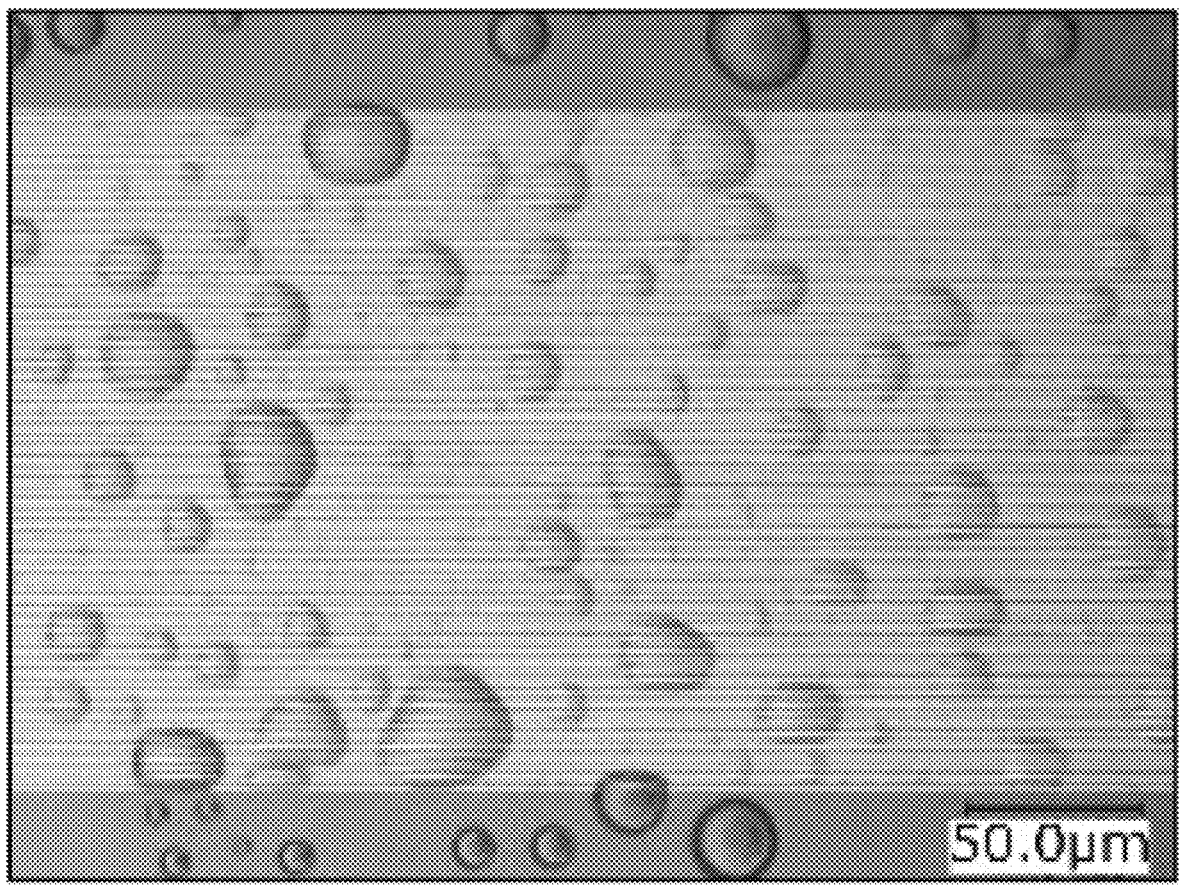
FIG. 4C is an optical microscope image on a surface of a detector, which is video clipped at a specific time in the current peak of the current response shown in FIG. 3.

The changes with time in the current response when water droplets are sprayed onto a surface of a detector are shown in FIG. 3(a). It was found that a current response is generated corresponding to the introduction of water droplets onto a surface of a detector accompanying the opening and closing of a shutter of a nebulizer. Further, the output signal showed a similar peak shape with the lapse of time. One of the peaks (test time: 470 to 520 seconds) is enlarged and shown in FIG. 3 (b). In this way, it was found that although the output signal is generated immediately after the opening operation of the shutter, the closing operation of the shutter does not coincide with the timing of disappearance of the output signal. In addition, it was also found that the output signal is rapidly increased, and then gradually attenuated with the lapse of time. Optical microscope images on a surface of a detector, which are video clipped at a specific time in the current peak are shown in FIGS. 4A to 4C. In this regard, the output signal is started to be increased in 1.0 second from the time point of 480.0 seconds when the shutter was opened, and at the same time, water droplets were observed on a surface of a detector. This time lag is considered to be due to the distance from the shutter to the surface of a detector. Further, water droplets are observed on a surface of a detector even at 481.8 seconds when the output signal shows a peak, however, the largest number of water droplets was observed at 488.8 seconds. Furthermore, the observed water droplets are reduced with the lapse of time, and disappeared completely at 512.0 seconds.

From these results, the relationship between the water droplet shape due to the contact of water droplets onto a surface of a detector and the output signal is presumed as follows.

1) The output signal is detected due to the attachment of water droplets onto a surface of a detector, however, since the rate-determining process shifts from nucleation to nuclear growth of water droplets, the number of water droplets are decreased and the size of one water droplet is increased, and therefore, the output signal shows a peak shape. In this regard, it is considered that to the peak shape shown in FIG. 3(b), not only the nucleation of water droplets and the subsequent nuclear growth, but also the consumption of dissolved oxygen and the subsequent dissolution are contributed.

2) As the particle diameter of a water droplet is smaller, the output signal can be decreased.

3) As the water droplet disappears, the output signal disappears.

On the other hand, in a case where this type of a detector is used, the determination of the size of a water droplet cannot be performed or is difficult in a strict sense with a single type of a detector. Because in a case where a sufficiently large output (current) is detected, it can be understood that a water droplet having a size larger than the gap between electrodes is attached, however, in a situation in which no output is detected, since there are two cases of a situation in which the size of a water droplet is sufficiently small and a situation in which to begin with, a water droplet is not attached to the gap at all, and therefore, it does not necessarily mean that a water droplet having a size smaller than the gap is attached.

Therefore, according to one embodiment of the present invention, instead of using a single type of liquid droplet detector, multiple types of liquid droplet detectors having the relationships different from one another between the size of the attached liquid droplet and the detection output are combined. By adopting this configuration, for example, in a case where the detection output appears in a first type of liquid droplet detector in which a detection output rises even when a liquid droplet having a relatively small size is attached but the detection output does not appear in a second type of liquid droplet detector in which a detection output is obtained for the first time with a liquid droplet having a relatively large size, the liquid droplets are surely attached to these liquid droplet detectors, and the size can be determined to be the detection limit or more of the first type of liquid droplet detector and less than the detection limit of the second type of liquid droplet detector.

In addition, in the measurement using a single liquid droplet detector, there may be a case where the output of the detector is greatly influenced by the factors other than the size of the liquid droplet (for example, the air temperature, the concentration of impurities such as salts contained in liquid droplets, the amount of liquid droplets given per unit time to these detectors, or the like, being also referred to as disturbance), and which may influence on the detection results of the liquid droplet. On the other hand, in a case where multiple liquid droplet detectors are used, by grasping in advance the mutual relationships between the detectors of the influence of the disturbance on the outputs of the respective detectors (for example, there is a proportional relationship, the difference is constant, the output fluctuation is generated in directions opposite to each other, or the like), the influence on the final determination results can be eliminated or reduced. Of course, the accuracy of the determination processing can also be increased by separately obtaining the values of these factors by measurement or the like (for example, arrangement of a thermometer, or the like), and by the obtained values alone or in combination with the mutual relationships that are brought into the outputs of multiple liquid droplet detectors by the factors described above. Of course, calibration processing that is a technique frequently adopted in various measurements for eliminating/reducing adverse influences of various disturbances, and performs measurement by giving a standard (known) object to be measured to these measuring instruments can also be performed.

Figure 5:
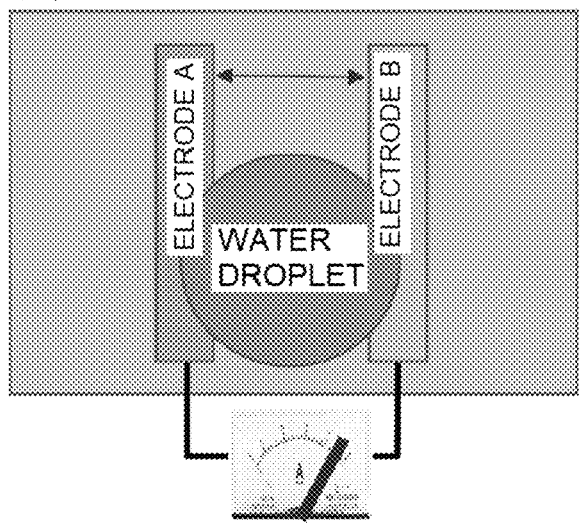
FIGS. 5(a), 5(b) and 5(c) are conceptual diagrams showing the technique for making the relationship between the size of an attached liquid droplet and the detection output different in a liquid droplet detector conceptually shown in FIG. 1.
Figure 5:
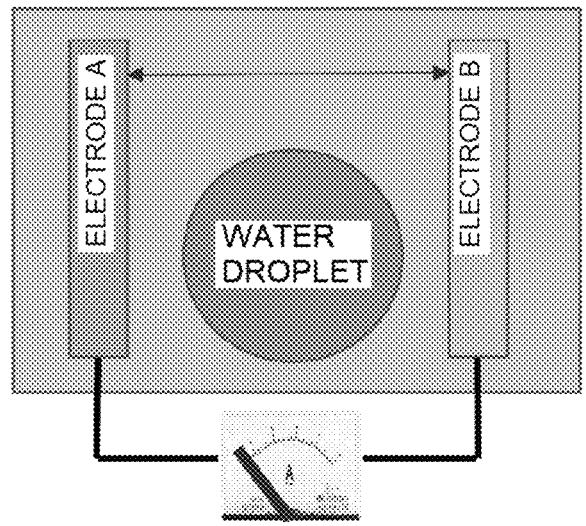
Figure 5:
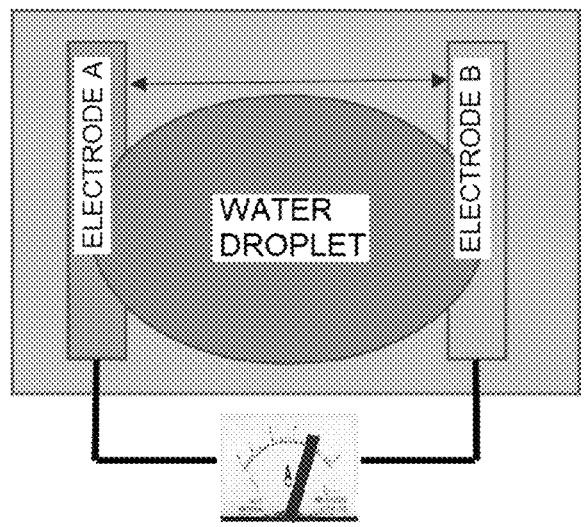

In order to make the relationship between the size of a liquid droplet attached to a liquid droplet detector and the detection output different, in the liquid droplet detector conceptually shown in FIG. 1, the gap width between electrodes may be changed as conceptually shown in FIG. 5. FIG. 5(a) shows a state in which a water droplet having a size slightly larger than the gap width is attached to a liquid droplet detector having a relatively small gap width. In this state, the structure of [electrode A]-[water droplet]-[electrode B] forms a cell, and a current flows between both electrodes. On the other hand, in a liquid droplet detector having a gap width larger than the size of a water droplet, which is shown in FIG. 5(a), as shown in FIG. 5(b), even if the same liquid droplet is attached, this water droplet cannot connect (also referred to as bridge) between the electrode A and the electrode B, and therefore, a cell is not formed, and a current does not flow. In order to allow a liquid droplet detector having a relatively large gap width as shown in FIG. 5(b) to form a cell and to allow a current to flow, a water droplet having a size sufficiently larger than that shown in FIG. 5(a) is required to be attached as shown in FIG. 5(c). Accordingly, as the above-described first liquid droplet detector and second liquid droplet detector, for example, the liquid droplet detector shown in FIG. 5(a), and the liquid droplet detector shown in FIG. 5(b) or 5(c) can be used, respectively.

In this regard, when referring to "size of an attached liquid droplet", it is required to understand that it does not refer to the size of a liquid droplet at the time point of the attachment, but refers to the current size of a liquid droplet, which may be changed by the gathering with another liquid droplet attached to the adjacent position or the gathering of an existing liquid droplet with a liquid droplet newly attached to the existing liquid droplet, or by the growth of a liquid droplet due to absorption of vapor present in the atmosphere, or further conversely, by the reduction of a liquid droplet due to evaporation of the attached liquid droplet. In addition, from this point of view, it is required to pay attention to the point that the time changes in the size of the attached liquid droplet can be observed by using a droplet size determining device.

Figure 6:
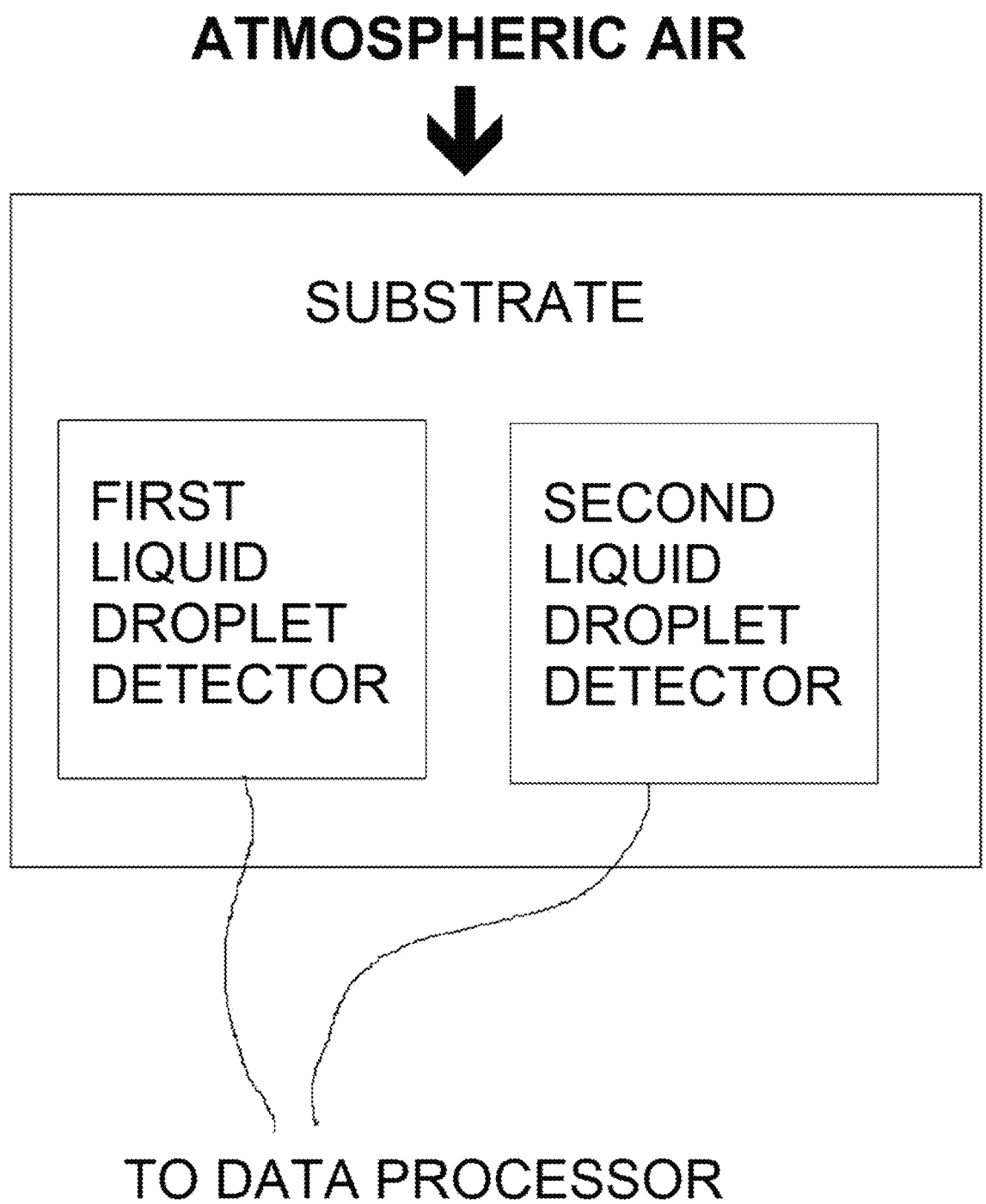
FIG. 6 is a conceptual diagram showing a configuration example of a droplet size determining device.

A conceptual diagram of a configuration example of the droplet size determining device according to one embodiment of the present invention is shown in FIG. 6. In the droplet size determining device shown in FIG. 6, a first liquid droplet detector and a second liquid droplet detector, which have different relationships from each other between the size of the attached liquid droplet and the detection output, are arranged close to each other on a substrate. For example, the atmospheric air is supplied to these liquid droplet detectors arranged on a substrate. Liquid droplets contained in the atmospheric air, or liquid droplets generated by dew condensation of the vapor contained in the atmospheric air are attached to these detectors. The detection output appeared as a result of the above attachment is introduced into a data processor (not shown), and the above-described determination processing of the size of a liquid droplet is performed. In a case where the first and second liquid droplet detectors operate on the principle shown in FIG. 1 as described above, by recording a table showing the relationship between the size of a liquid droplet and the current value for each of these liquid droplet detectors, the determination processing can be realized. Further, the processing for eliminating/reducing the influence of various disturbances on the determination results as described above can also be performed by the data processor.

In this regard, in the above description, when considering, for example, the case where a liquid droplet floating in the air is attached onto a surface of a detector, such a liquid droplet is attached onto a surface of a detector at a certain ratio (number/unit time), and the liquid droplet attached once may disappear in a case of a volatile liquid droplet such as water, although depending on the surrounding vapor pressure. Further, in a case where the increase and disappearance of the attached liquid droplets are balanced, some equilibrium state may be maintained. Therefore, it is required to pay attention to the fact that there may be a case where the signal from a liquid droplet detector is observed as a time-changing signal. However, even in such a case, the above-described principle and the like of the present invention are not adversely affected.

In this regard, in a case where a large amount of liquid droplets are attached onto a surface of a liquid droplet detector by blowing or the like a gas in which an extremely large amount of the liquid droplets are floated onto the surface, there may be a case where a continuous liquid film is formed on the surface of a liquid droplet detector by gathering these attached liquid droplets to each other. However, except for such an extreme case, when the size of a liquid droplet is determined according to the present invention, even in a case where the above-described equilibrium state has appeared, usually the state is a state in which liquid droplets are relatively sparsely scattered on the surface of a liquid droplet detector in many cases.

In addition, although the above description relates to a case of using two types of liquid droplet detectors having the relationships different from each other between the size of a liquid droplet and the detection output, in a case where three or more types of detectors having the relationships different from one another are arranged or the like on the substrate shown in FIG. 6 and are used, the size of a liquid droplet can be determined more finely. In this regard, also as described above, the relationship between the size of a liquid droplet and the detection output does not necessarily have to be a binary relationship of on/off. For example, in a case of a liquid droplet detector of the type shown in the conceptual diagram of FIG. 1, and in a case where the size of a liquid droplet is the same as the gap or slightly larger than the gap, a cell is formed when the attachment position of a liquid droplet is exactly in the middle of the gap width a cell is formed, however, in a case where the attachment position of a liquid droplet is deviated from the middle of the gap width, a cell is not formed because the liquid droplet is in contact with only one of the electrode A and the electrode B, and thus a current does not flow. Further, even in a case where a cell is formed, the internal resistance of the cell to be formed is increased in a case where the liquid droplet is only extremely and slightly in contact with only at least one of the electrode A and the electrode B, and thus the flowing current value becomes small. Therefore, it should be noted that by combining the outputs from multiple detectors, the size determination in many stages (or continuous size determination), the number of the stages is more than the number of the types of the detectors to be used, can be performed.

In addition, it is considered that although there is a difference in degree, the actual liquid droplets usually do not become monodisperse particles, and the size distribution has a certain extent. Even in such a case, the dispersion of the size can be estimated from the output of a liquid droplet detector. For example, as described in the embodiment later, in a case where liquid droplets having sizes different from each other are attached so as to straddle over electrodes, the speed of contraction of each of the liquid droplets accompanying the drying of the liquid droplets varies depending on the size, and thus the decay rate with respect to the time of the current value differs. When considering the distribution and dispersion of the size of a liquid droplet, it is normally assumed that a large number of liquid droplets having sizes different from one another are attached to a liquid droplet detector. Therefore, each of these liquid droplets generates a detection signal that reflects the size reduction due to the drying, and the collected signals are observed as the time change of the detection output of the liquid droplet detector. By statistically analyzing the changes in the detection output, the distribution of the sizes of liquid droplets can be estimated. The estimation of such a size distribution, that is, the presumption can also be considered to be one type of the size determination.

As one way of thinking when estimating and presuming such a distribution of the sizes of liquid droplets, the time change of the output signal from a liquid droplet detector can be regarded basically as being approximated by one obtained by synthesizing the output signals of a liquid droplet detector for liquid droplets for each of the sizes of the liquid droplets contained in a sample for the entire range of the size distribution. The application of the "principle of superposition" that the entire output can be approximated by superimposing the outputs for each of the sizes of liquid droplets can give the approximation with high accuracy in a case where particularly liquid droplets are attached onto a surface of a liquid droplet detector at a relatively low density (that is, the influence of mutual output based on the different sizes of the liquid droplets is small). According to the way of thinking based on such linearity, conversely, size distribution of liquid droplets in a sample to be measured can be easily presumed on the basis of the output signals from the multiple liquid droplet detectors having gap widths different from one another. Here, the output signal for each of the sizes of liquid droplets for use in the above presumption (generally expressing, a function that gives a function of the time changes in output signals from the sizes of liquid droplets) may be actually measured by blowing a gas containing the liquid droplets having a monodisperse size distribution or having a droplet size distribution that can be regarded as being monodisperse from the viewpoint of the estimation accuracy to be determined (in the present application, both of them are collectively referred to as monodisperse liquid droplets, liquid droplets being monodisperse, or the like) to a liquid droplet detector under predetermined conditions, or can be determined by the calculation on the basis of a model considered to be valid. Further, this kind of calculation and the actual measurement can be used in combination. Of course, the size distribution of liquid droplets can also be presumed without assuming such linearity.

Since various techniques widely known in the fields of statistics and the like can be used in conducting the estimation as described above, further detailed description is omitted in this present specification.

In estimating the size distribution of liquid droplets as described above, the entire output signals from multiple liquid droplet detectors may be used, however, in such a situation, if it is assumed that the calculation amount for estimation becomes excessively large, the attention can also be paid only to specific features (parameters) that are considered to reflect the size distribution well in the output signal waveform. Examples of such features include, but are not limited to, the slope of the output signal, the time delay of the rise, the time to reach the peak, and the output value at the time of the peak.

In this regard, in the following two embodiments, as can be understood with reference to FIGS. 7 and 8, there is a tendency that the output current value becomes smaller as the gap width of a liquid droplet detector is larger. However, this is not necessarily a common tendency observed for the combinations of the liquid droplets having all sizes and the liquid droplet detector. For example, according to the experiment by the inventors of the present application, when a cycle of spraying for 3 seconds the water droplets containing a large number of water droplets each having a size of 10 μm or more to a multichannel liquid droplet detector used in the second embodiment and of drying the water droplets is repeated, the result that the steady state (peak) output of the output from a liquid droplet detector having a gap width of 10 μm is larger than the corresponding output from other liquid droplet detectors was obtained. Therefore, it has been confirmed that the output at the time of the peak, and the relationship between the output at the time of the peak and the gap width are also the parameters influenced by the size distribution of liquid droplets.

In addition, it is considered that the detection output change of an ordinary liquid droplet detector is not linear to the size of a liquid droplet, but has high sensitivity only in the vicinity of a specific size. For example, in a liquid droplet detector shown in FIG. 1, a large detection output change is generated in a case where the size is changed in the vicinity of the value of the electrode gap width. In the configuration of the present invention, since multiple types of liquid droplet detectors having the relationships different from one another between the size of the attached liquid droplet and the detection output are used, the dispersion can be estimated with high resolution even in a case where the dispersion of the sizes of liquid droplets is large. In this regard, the condensation of liquid components from the air to a liquid droplet attaching to a detector and conversely the increase/decrease of the size of a liquid droplet by evaporation from the liquid droplet are influenced by the temperature of the air in the vicinity of the detector, the vapor pressure of the liquid components in this air, or the temperature of the detector itself. Accordingly, by incorporating a thermometer or a vapor pressure analyzer (hygrometer in a case of water) for measuring these temperatures and vapor pressures into a detector, or by arranging the thermometer or the vapor pressure analyzer in the vicinity of the detector, and by utilizing also the detection outputs from these instruments, the dispersion of the sizes of liquid droplets can be more accurately estimated.

In the description so far, a specific example in which the liquid constituting the liquid droplet is a conductive liquid such as an electrolytic solution has been used. However, as the liquid droplet floating in the air or attaching onto a surface of an object for some cause, there are some liquid droplets having almost no conductivity, for example, fine particles of oil. It is required to pay attention to the point that the detection of the size of a liquid droplet of the present invention can be applied regardless of the conductivity or non-conductivity of the liquid droplet. For example, by charging a liquid droplet having no conductivity such as oil, changing the measurement target from the current to the electric capacity, or the like, the object to be detected by a liquid droplet detector can be changed to a liquid droplet having almost no conductivity, and therefore, the size of the liquid droplet having almost no conductivity can be determined by using such a type of a liquid droplet detector.

EXAMPLES

Hereinafter, it will be more specifically described that the droplet size determining device can be configured by combining liquid droplet detectors having the gap widths different from one another between electrodes, the principle of the liquid droplet detectors is shown in FIG. 1. As an embodiment for that purpose, two types of liquid droplet detectors having the same structures as each other except that the electrode gap widths were different from each other were actually fabricated. Further, it was verified that these liquid droplet detectors actually operate as two types of liquid droplet detectors having the relationships different from each other between the size of a liquid droplet and the detection output. Accordingly, the size of a liquid droplet can be determined using a droplet size determining device obtained by combining these liquid droplet detectors.

Specifically, a liquid droplet detector having the structure shown in FIG. 1 and having an electrode gap width of 1 μm and a liquid droplet detector having the same structure as that of the above liquid droplet detector and having an electrode gap width of 20 μm were fabricated on an insulating substrate, respectively. In these two types of liquid droplet detectors, the same materials and structures were used except for the sizes of the gap widths, for example, using the same metals for the electrodes A and the same metals for the electrodes B. In this case, gold was used as the material for electrodes A, and copper was used as the material for electrodes B. In this regard, although the electrode A and the electrode B are shown as a pair of electrodes in FIG. 1, this is merely a conceptual structure, and as shown in Patent Literature 1, these electrodes of the present embodiment were configured such that a large number of thin wires made of metal, in which the thin wires in parallel to and adjacent to each other were an electrode A and an electrode B, respectively, were a so-called comb-shape electrode structure. Specifically, the number of thin wires (electrode wires) for the electrodes A and the electrodes B was 50, respectively. Of course, the shape of the combination of the electrodes A and the electrodes B is not limited to the comb shape, and a shape of both electrodes being close to each other over a long distance, for example, a double spiral shape or the like is preferred from the viewpoint of improving the sensitivity.

The breath of human beings was continuously blown against the droplet size determining device configured in this way. By bringing the air in the lung, which contains a large amount of water vapor and is maintained at around 37° C., into contact with the outside air, extremely fine water droplets are formed in the breath, however, it is considered that by bringing the breath containing such water droplets into contact with two types of liquid droplet detectors positioned close to each other on a substrate, liquid droplets having sizes substantially the same as one another and densities substantially the same as one another are attached onto surfaces of these liquid droplet detectors. In FIGS. 7(a) and 7(b), the time changes of output signals (currents) from liquid droplet detectors having gap widths of 1 and 20 μm are shown, respectively. As can be understood from FIG. 7, the current response was observed in a short period of time (within 1 second) in a case where the electrode gap width of the electrodes is small (FIG. 7(a)), however, it took a long period of time (around 15 seconds) before the current response was observed when the gap width was large (FIG. 7(b)). In addition, the inclination of the increase and decrease of the current becomes gentler as the gap width is larger. In addition, in this measurement, when the output signal reached the peak, the blowing of the breath was terminated. In this way, in any of the graphs of in FIGS. 7(a) and 7(b), when the output signal reaches the peak, a time change that turns to decrease from the peak value is generated after reaching the peak without much interval.

As can be confirmed from the measurement results, when the electrode gap width is small, even a liquid droplet having a small size connects (bridges) two opposing electrodes (electrode A and electrode B) by straddling over the two opposing electrodes, and therefore, only attaching an extremely small number of liquid droplets (there may be a case of one liquid droplet) to the gap, a current flows. On the other hand, in a case where the gap width is large even with the same particle diameter, only one liquid droplet cannot bridge between the electrodes, and the attached water droplets are gathered to adjacent other attached water droplets, become large with the growth or the like by getting water vapor remaining in the breath, and therefore, it takes time to bridge the electrodes. In addition, there is time dependency in the reduction of a liquid droplet accompanying the size increase and drying of a water droplet, and therefore, the inclination of the increase/decrease of the current becomes gentler as the gap width is larger. Of course, this is a phenomenon of a situation in which liquid droplets can be fused or grown, that is, a phenomenon in a case where a large number of liquid droplets or the vapor of the liquid droplets are continuously supplied. In a case where the growth of liquid droplets can be substantially ignored, for example, a relatively small number of liquid droplets are supplied for a short period of time, the output current of FIG. 7(b) is hardly observed.

A droplet size determining device using a multichannel liquid droplet detector in which liquid droplet detectors having four types of gap widths (0.5 μm, 1 μm, 5 μm and 10 μm) had been arranged close to one another on a substrate, which is another embodiment of the present invention, was fabricated. Here, each of the liquid droplet detectors is referred to as a channel. In the present embodiment, four channels having the gap widths different from one another are arranged. In FIG. 8, graphs of the time change of the output signals (currents) from respective channels, which were obtained when the breath of human beings was blown against the multichannel liquid droplet detector of the present device in a similar manner as in the measurement shown in FIG. 7 are shown. In this regard, the blowing of the breath was started after the lapse of 3 seconds from the starting time of the current measurement, which was different from the measurement in FIG. 7.

Figure 7:
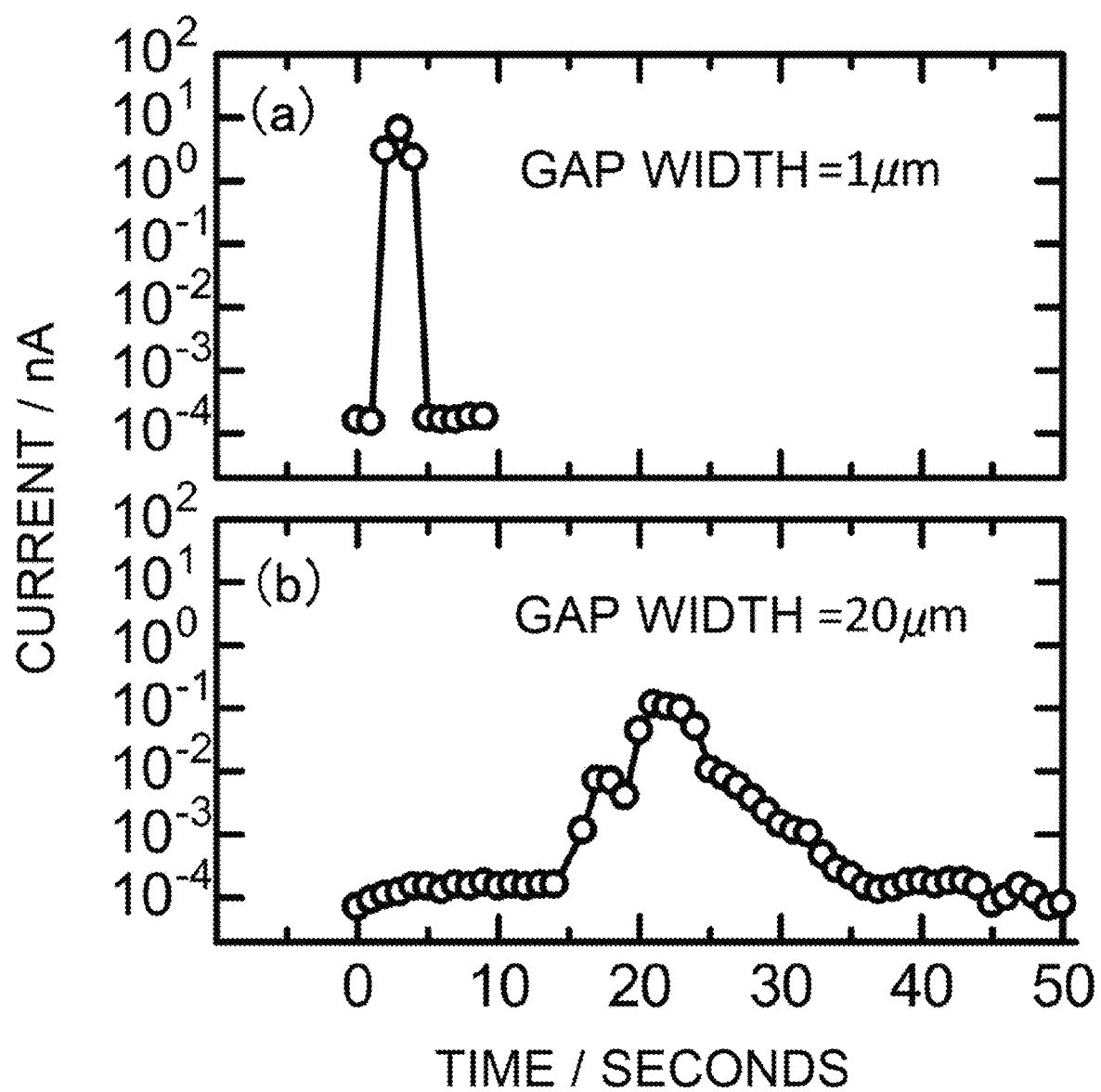
FIG. 7 is a diagram showing the difference between the responses of two liquid droplet detectors having the structures shown in FIG. 1 and having electrode gap widths different from each other.

Although being similar also in measurement, the results of the measurement are shown in FIG. 7, in the water droplets floating in the breath, there is no water droplets having extremely large sizes, and the water droplets are not monodisperse, and distributed over a certain range. It should be noted that the output of the liquid droplet detector in a case where such a sample is given changes in accordance with the size distribution as compared with the output assumed for a case of applying monodisperse liquid droplets using the model of FIG. 5, and basically becomes broad.

In this regard, in FIG. 7, the following phenomenon was observed: the output current rose almost without being delayed after the start of blowing of the breath in a case of the gap width of 1 μm shown in FIG. 7(a), but in contrast, the output current rose with being considerably delayed after the start of blowing of the breath in a case of the gap width of 20 μm shown in FIG. 7(b). On the other hand, in the present embodiment, such a time delay was hardly observed even in the output of the channel having the maximum gap width of 10 μm as shown in FIG. 8. The reason why the time delay was hardly observed in any of the channels in this way in the present embodiment is considered to be because the size distribution of water droplets in the blown breath was spread to a size of around 10 μm or larger. Of course, it should be noted that there are individual differences in the size distribution of water drops in the breath, and even in a case of the breath of the same human being, it is considered that the size distribution is diversely changed under various conditions of the physical condition such as a body temperature, the outside air temperature, the flow rate of the breath, and the like, and therefore, if the same experiment is performed under different conditions, there is a possibility that results different from those shown in FIG. 8 may be obtained.

However, as already described above, the time change of the output signal of each of the channels in a case where the sizes of liquid droplets are distributed in a certain range can be basically approximated as a synthesized one that is obtained by synthesizing the output signals of the channels to the liquid droplets having individual sizes in the liquid droplets (in other words, monodisperse liquid droplets) contained in a sample over the entire range of the size distribution, that is, as a superimposed one, and therefore, conversely, the size distribution of liquid droplets in a sample to be measured can be estimated on the basis of the output signals from multiple channels.

Figure 8:
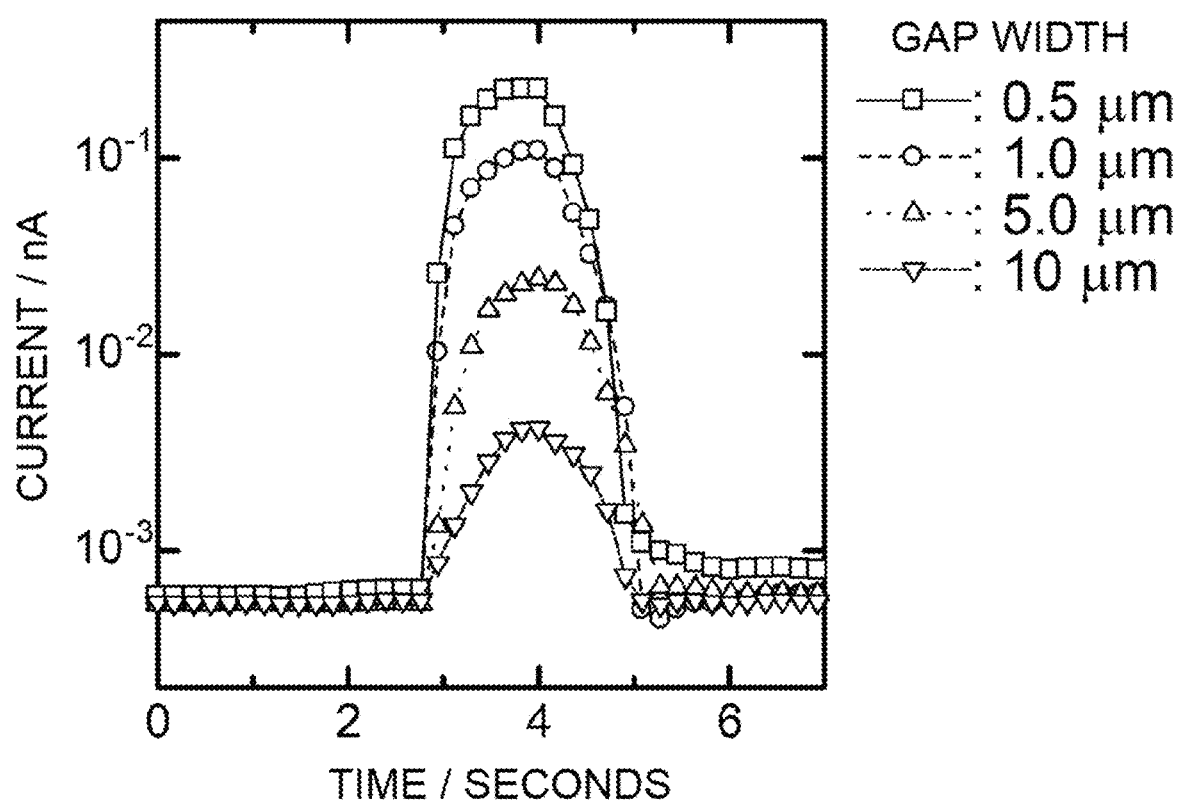
FIG. 8 is a diagram showing four responses from a multichannel liquid droplet detector in which four liquid droplet detectors having the structures shown in FIG. 1 and having electrode gap widths different from one another are arranged close to one another on a substrate.

For example, when comparing the aspects of changes in the output from the liquid droplet detectors having various types of gap widths as shown in FIG. 8, it can be understood that as the gap width is increased, the rise of the current becomes slower, and therefore, the output from the liquid droplet detector having a smaller gap width reaches the peak in a short period of time. As described above, for example, the inclination of output signals, the time required for reaching the peak, the time delay from the start of blowing to the rise of the output as described above, or the like varies depending on the gap width, and further considering the operation principle of the liquid droplet detector used here, it is natural that this is influenced by the size distribution of liquid droplets. Therefore, it will be understood that by using various feature amounts on the time change curve of such an output, the size distribution of liquid droplets can be estimated.

In addition, if the multichannel liquid droplet detector as described above is arranged not only at one place but also along each of the multiple flow paths of gas containing liquid droplets, the accuracy of estimation of the size distribution of liquid droplets can further be improved.

Of course, such a multichannel liquid droplet detector can be used for a sample having the size distribution of liquid droplets of monodisperse or of nearly close to the monodisperse. In that case, the determination of size of a liquid droplet can be performed with high accuracy with a resolution corresponding to the number of channels.

INDUSTRIAL APPLICABILITY

As described in detail above, according to the present invention, the size of a liquid droplet can be easily determined, and therefore, it is expected to be applied to many technical fields handling a liquid droplet.

CITATION LIST

Patent Literature

Patent Literature 1: WO 2016/013544 A

Non Patent Literature

Non Patent Literature 1: Engaji et al, Toyota Tech. rep., 40 (1987), p.
Non Patent Literature 2: Instruction manual Ver. 2 of a dew condensation detector MH-045 manufactured by EKO Instruments (date of issue: unknown)

The invention claimed is:

1. A droplet size determining device comprising:
a first type of liquid droplet detector having a first relationship between a size of a liquid droplet and a detection output; and
a second type of liquid droplet detector having a second relationship different from the first relationship,
wherein sizes of liquid droplets attached to the first type of liquid droplet detector and the second type of liquid droplet detector are determined at least on the basis of output signals from the first type of liquid droplet detector and the second type of liquid droplet detector,
wherein the output signals from the first type of liquid droplet detector and the second type of liquid droplet detector are current values,
wherein the size of a liquid droplet to be determined is a distribution of sizes of liquid droplets attached to the first type of liquid droplet detector and the second type of liquid droplet detector,
wherein the output signal from the first type of liquid droplet detector has a feature different from the output signal from the second type of liquid droplet detector, the feature being at least one selected from the group consisting of the slope of the output signal, the time delay of the rise, the time to reach the peak, and the output value at the time of the peak, in the output signal waveform, and
wherein the determination is performed on the basis of the feature.

2. The droplet size determining device according to claim 1,
wherein the first type of liquid droplet detector provides a detection output in response to attachment of a liquid droplet having a size different from that of a liquid droplet of the second type of liquid droplet detector.

3. The droplet size determining device according to claim 1, further comprising
at least one of another type of liquid droplet detectors having a relationship different from the first relationship and the second relationship,
wherein sizes of liquid droplets attached to the first type of liquid droplet detector, the second type of liquid droplet detector, and another type of liquid droplet detector are determined further on the basis of output signals from another type of liquid droplet detector.

4. The droplet size determining device according to claim 1,
wherein a pair of electrodes is arranged with a gap between the electrodes in the liquid droplet detectors, the electrodes are made of different kinds of metals from each other.

5. The droplet size determining device according to claim 1,
wherein the liquid droplet contains water.

6. A droplet size determining method comprising
determining sizes of liquid droplets attached to a first type of liquid droplet detector and a second type of liquid droplet detector
at least on the basis of
a first detection output from the first type of liquid droplet detector, and
a second detection output from the second type of liquid droplet detector,
wherein the first type of liquid droplet detector has a first relationship between a size of a liquid droplet and a detection output,
wherein the second type of liquid droplet detector has a second relationship different from the first relationship,
wherein the first detection output and the second detection output are current values,
wherein the size of a liquid droplet to be determined is a distribution of sizes of liquid droplets attached to the first type of liquid droplet detector and the second type of liquid droplet detector, wherein the first detection output from the first type of liquid droplet detector has a feature different from the second detection output from the second type of liquid droplet detector, the feature being at least one selected from the group consisting of the slope of the output signal, the time delay of the rise, the time to reach the peak, and the output value at the time of the peak, in the output signal waveform, and wherein the determination is performed on the basis of the feature.

7. The droplet size determining method according to claim 6, wherein the first type of liquid droplet detector provides the first detection output in response to attachment of a liquid droplet having a size different from that of a liquid droplet of the second type of liquid droplet detector.

8. The droplet size determining method according to claim 6, further comprising determining sizes of liquid droplets attached to the first type of liquid droplet detector, the second type of liquid droplet detector, and at least one of another type of liquid droplet detectors on the basis of an output signal from another type of liquid droplet detector, wherein another type of liquid droplet detector has a relationship different from the first relationship and the second relationship.

9. The droplet size determining method according to claim 6, wherein a pair of electrodes is arranged with a gap between the electrodes in the liquid droplet detectors, the electrodes are made of different kinds of metals from each other.

10. The droplet size determining method according to claim 6, wherein the liquid droplet contains water.

11. The droplet size determining method according to claim 6, further comprising performing the determination on the basis of each output in a case where monodisperse liquid droplets are attached to the first type of liquid droplet detector and the second type of liquid droplet detector.

12. The droplet size determining method according to claim 11, wherein the output in a case where the monodisperse liquid droplets are attached includes a group of outputs in a case where a size of the monodisperse liquid droplets is changed in a predetermined range.

* * * * *